United States Patent

Shellhause

[15] 3,691,903
[45] Sept. 19, 1972

[54] HYDRAULIC POWER BRAKE BOOSTER

[72] Inventor: Ronald L. Shellhause, Vandalis, Ohio

[73] Assignee: General Motors Corporation, Detroit, Mich.

[22] Filed: Sept. 13, 1971

[21] Appl. No.: 179,684

Related U.S. Application Data

[62] Division of Ser. No. 76,473, Sept. 29, 1970.

[52] U.S. Cl. ...................91/49, 91/369 A, 91/372, 91/376, 91/431
[51] Int. Cl. .................F15b 13/16, F15b 13/04
[58] Field of Search ..91/49, 431, 369 A, 369 R, 372, 91/373, 376

[56] References Cited

UNITED STATES PATENTS

| | | |
|---|---|---|
| 1,921,590 | 8/1933 | Staude............................91/49 |
| 3,082,744 | 3/1963 | Gardner......................91/372 |
| 3,143,926 | 8/1964 | Stelzer.........................91/372 |
| 3,410,178 | 11/1968 | Kytta......................91/369 A |

Primary Examiner—Paul E. Maslousky
Attorney—W. E. Finken et al.

[57] ABSTRACT

A hydraulic power brake booster powered by power steering gear pump pressure and utilizing an open-center valve so that fluid flows through the booster without pressure reduction when the booster is not activated. The valve assembly includes a radially floating valve seat which provides for self-centering, permits a valve separation operation to pass viscous cold hydraulic fluid or any elements which may tend to overly restrict the valve. It also includes a valve face design providing entrance and exit angles defining a venturi-type passage conductive to laminar flow with consequent reduction in valve noise, and has a hydraulic reaction mechanism which includes an arrangement for supported line pressure.

1 Claim, 3 Drawing Figures

PATENTED SEP 19 1972　3,691,903

INVENTOR.
Ronald L. Shellhause
BY
D.D. McGraw
ATTORNEY

HYDRAULIC POWER BRAKE BOOSTER

This is a division of Ser. No. 76,473, filed Sept. 29, 1970.

The invention relates to a hydraulic power brake booster using an open-center valve arrangement, and more particularly to one in which a conical valve seat and valve face cooperate and are constructed so as to provide a self-centering action. The input valve member is stopped against the booster body to establish an open position of the valve member, and the valve seat is stopped against the power piston, which in turn is also stopped against the cylinder body so that the valve opening is established by the cylinder body. This permits the power piston to move under the pressure influence of cold viscous oil through the valve opening without pulling the input valve member with the power piston. The resulting piston travel rapidly increases the effective valve opening and permits viscous cold oil to pass through the valve as the valve operates without causing the brakes to be applied to such an extent that they will drag. The piston travel required to open the valve to the necessary extent is relatively slight. This arrangement also minimizes the pedal travel necessary to actuate the unit by permitting the initial or at-rest valve opening to be set for warm oil conditions.

The valve seat is mounted in the power piston so that it is radially movable when the valve member engages the seat to position the valve seat concentrically with the valve input member. This insures a concentric annular valve opening which will also minimize valve noise as well as provide consistent valve controlling action.

The valve assembly also has a hydraulic reaction piston reciprocably movable in the power piston and in the valve seat and arranged to pivotally seal relative to the piston and valve seat to accommodate the radial floating movement of the valve seat. A supported line pressure spring between the hydraulic reaction piston and the valve seat provides for hold-off of reaction force during the initial apply phase of the booster to obtain proper power unit feel. A reaction snubber and snubber piston are provided at the point of contact between the reaction piston and the valve input member to further eliminate valve noise and to provide a damping arrangement for the reaction piston.

Figure 1:
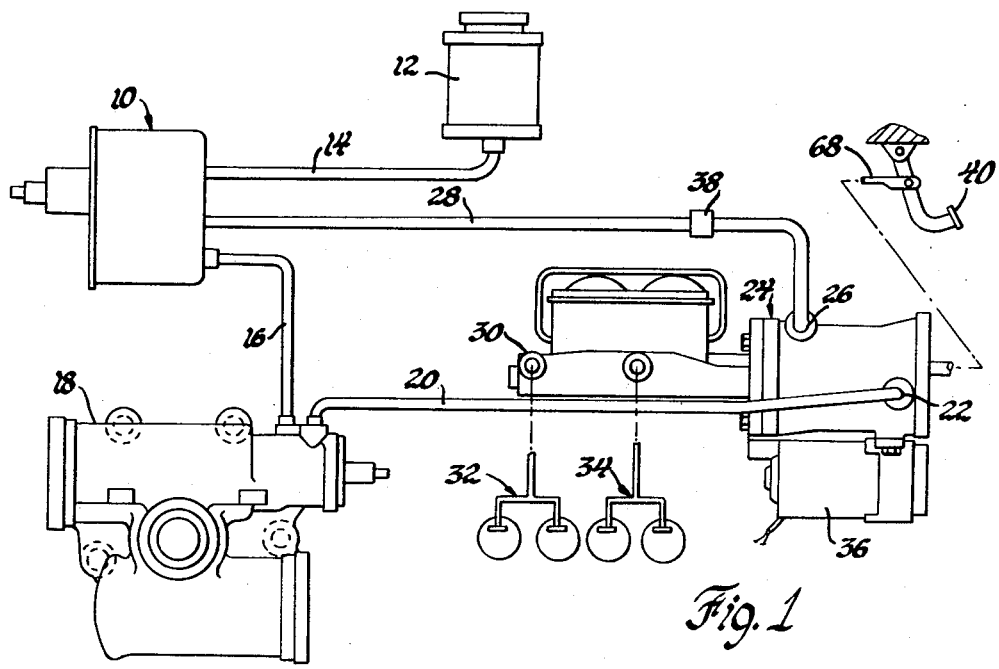
FIG. 1 is a schematic representation of a vehicle power steering and braking system embodying the invention.

In the system shown in FIG. 1, the power steering pump 10 is provided with a hydraulic fluid reservoir 12 connected to the input side of the pump by conduit 14. The pump output conduit 16 is connected to the power steering gear 18, which is of the open-center type so that in the at-rest position hydraulic fluid is pumped freely through the gear. The conduit 20 connects the output side of the power steering gear 18 with the inlet 22 of the hydraulic power brake booster 24. The booster outlet 26 is connected to the sump or inlet side of the power steering pump 10 by conduit 28, thus completing the hydraulic fluid circuit.

The booster 24 is connected to actuate a master cylinder assembly 30 which provides brake pressure to the front brake system 32 and the rear brake system 34 of the vehicle in which the hydraulic system is installed. The booster 24 is also shown as being provided with an electro-hydraulic pump 36 which is actuated when necessary to provide sufficient hydraulic fluid flow and pressure availability to operate the booster 24 when insufficient hydraulic fluid flow and pressure availability is provided through conduit 20. The pump 36 is arranged to be actuated as necessary, and may, for example, be actuated by a flow switch 38 provided in one of the conduits, such as conduit 28. The booster assembly 24 is schematically illustrated as being controlled by the vehicle brake pedal 40.

Figure 2:
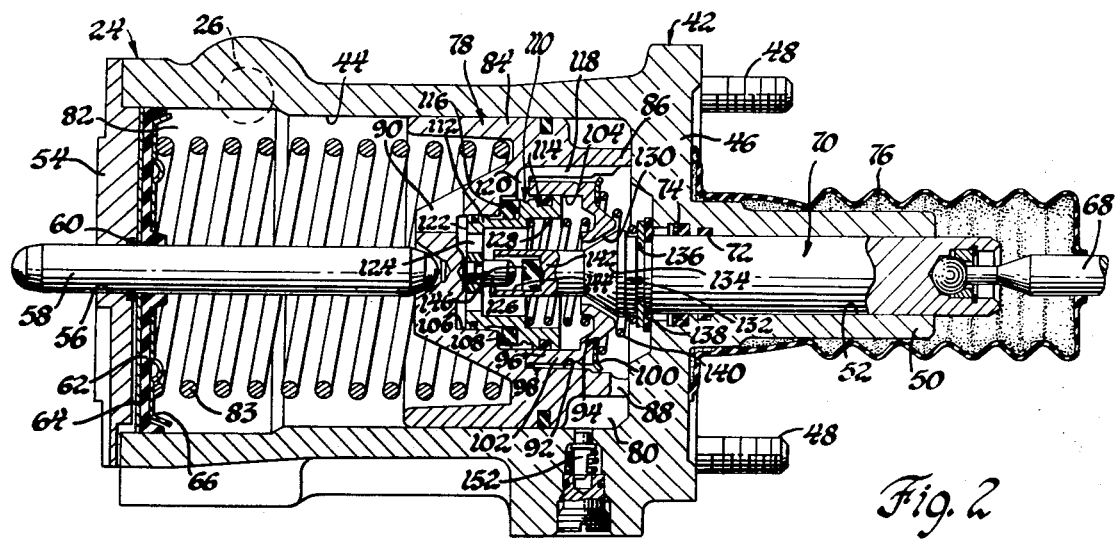
FIG. 2 is a cross section view of the hydraulic brake booster used in the system of FIG. 1.
Figure 3:
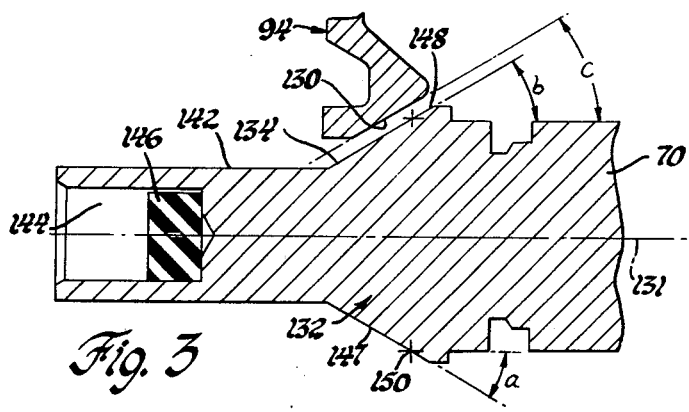
FIG. 3 is an enlarged view of the valve input member portion of the open-center valve provided in the booster of FIG. 2.

The booster assembly 24 is illustrated in detail in FIG. 2. The housing 42 is formed to provide a cylinder 44. The rear end 46 of the cylinder provides for booster mounting by means of studs 48. Cylinder rear end 46 is also formed to provide a rearwardly extending sleeve 50 which is provided with a bore 52 extending through the sleeve and rear end 46 and axially aligned with the cylinder 44. The forward end 54 of the housing 42 has a cylinder cover which is centrally apertured at 56 so that the booster output push rod 58 extends therethrough and is reciprocably moved when the brake is operated. A suitable seal 60 is also mounted in cover 54. The cylinder seal 62 is provided with a seal support plate 64 fitting against the inner wall of the cover 54, and a seal expander 66 on the cylinder side of the seal.

The brake pedal assembly 40 acts through the push rod 68 to actuate the booster. The forward end of push rod 68 is connected to input member 70 which is slidably received in bore 52 of sleeve 50 and extends into the cylinder 44. The inner portion of bore 52 is provided with an O-ring seal 72 and a V-block seal 74 which effectively prevent leakage of hydraulic fluid between input member 70 and bore 52. A suitable boot 76 is also mounted over sleeve 50 and push rod 68 to prevent contamination.

The cylinder 44 is divided by a power piston 78 into an inlet or power chamber 80 and an outlet or exhaust chamber 82. Piston 78 is reciprocably movable in cylinder 44 during brake booster operation and is urged to the brake release position by spring 83. The piston includes a sealed skirt section 84 which fits cylinder 44, and has at its rearward end a positioning abutment sleeve 86. This sleeve is of smaller diameter than the skirt section 84 and is suitably notched as at 88 to permit full fluid communication between all portions of the inlet chamber 80. Piston 78 is also provided with passage means interconnecting the inlet chamber 80 and the outlet chamber 82, the passage means including a passage 90 extending through the piston wall and a stepped recess 92 which mounts the valve and reaction mechanism. The valve mechanism controls the flow of hydraulic fluid from the inlet chamber 80 to the outlet chamber 82 through the passage means, thereby controlling the pressure differential across the power piston 78. The larger rearward portion of recess 92 provides a mounting for the valve seat 94. The forward end 96 of valve seat 94 abuts against a shoulder 98 formed as a part of stepped recess 92. A valve seat spring retainer 100 fits in the outer end of recess 92 and engages the valve seat 94 so as to position the valve seat against axial movement relative to the power piston 78. The valve seat has a cylinder-like skirt section 102 which is the section between recess shoulder 98 and retainer 100. The outer periphery of skirt section 102 is of substantially less diameter than the portion of recess 92 in which it fits so as to provide for radial movement of the valve seat. Retainer 100 engages the valve seat and permits such radial movement while tending to hold the valve seat in any radial position to which the valve seat is moved through its spring-like action urging the valve seat end 96 against shoulder 98.

The valve seat skirt section 102 has a cylinder 104 formed by the interior wall thereof. Also, cylinder section 106 is formed in the forward part of stepped recess 92 and is of smaller diameter than cylinder 104. Stepped recess 92 also includes an intermediate cylinder section 108 and the shoulder 98. A reaction piston 110 has a small diameter forward land 112 received in cylinder section 106 and rearward larger diameter land 114 received in cylinder section 104. A portion of reaction piston 110 between the lands is stepped to provide a mounting for the reaction piston snubber 116. Snubber 116 is positioned in cylinder section 108 and cushions forward movement of the reaction piston 110. A groove 118 in power piston 78 fluid connects inlet chamber 80 with cylinder section 108 so that the reaction piston 110 and the cylinder section 108 cooperate to define a reaction chamber 120. Reaction piston 110 is generally cup-shaped and its forward face 122 at land 112 is provided with axially extending passages 124 which fluid connect outlet chamber 82, through passage 90 and the forward portion of recess 92, with the downstream side of the valve seat 94. A snubber piston 126 is secured to the rear side of reaction piston face 122 and extends rearwardly in a manner and for the purposes described below. A supported line pressure spring 128 is positioned within reaction piston 110 and valve seat 92 so as to urge the reaction piston forwardly relative to the valve seat against the force of pressure in reaction chamber 120.

Valve seat 94 includes a frusto-conical seat face 130 with the larger face opening extending rearwardly and the smaller face opening extending forwardly. The seat face is aligned coaxially with the power piston 78, the input member 70, the stepped recess 92, the reaction piston 110, the snubber piston 126, and the output push rod 58. The seat face is constructed so that it extends at an angle of 30° to the common axis 131 of these elements.

The input member 70 includes a valve 132 formed to provide a frusto-conical valve face 134 which is positioned to mate with and extend through valve seat face 130. For descriptive purposes the valve and valve seat faces will be referred to as being conical, it being understood that this term encompasses a conical section formed by the frustum of a right circular cone. At the rearward side of valve 132, the input member 70 is provided with a snap ring 136 and immediately behind the snap ring is a valve return bumper 138. The bumper is formed of a rubber-like material and prevents the snap ring from directly contacting the housing rear end 46, thereby cushioning the valve return and further eliminating valve operating noise. A valve return spring 140 seats on snap ring 136 at one end and on valve seat retainer 100 at the other end to urge the valve faces apart and, therefore, position the valve 132 in relation to the cylinder end wall 46 when the booster is at rest. The forward end of input member 70, forward of valve face 134, is provided with an end section 142 located within the chamber formed by recessed reaction piston 110 in which spring 128 is positioned. The end section is provided with a cylinder-like recess 144 which is somewhat larger in diameter than snubber piston 126. The rear end of snubber piston 126 extends slightly into recess 144. A rubber-like snubber 146 is received at the bottom of recess 144 and is slightly spaced from the spherical end of snubber piston 126 when the booster is at rest.

The valve face 134 of valve 132 is comprised of a face forward surface 147 and a face after surface 148 which join at the circumferential line of contact 150. The forward and after face surfaces are frusto-conical, with the forward surface 146 forming the angle $a$ relative to the axis of the valve, this angle being nominally 31°. The face after surface 148 forms the angle $b$ relative to the axis of the valve and is nominally 29°. This arrangement, with angle $c$ of seat face 130 nominally at 30°, provides a venturi-like valve opening. By providing the proper entrance and exit throat angles relative to the metering point defined by the valve circumferential line of contact 150, with the valve faces being smoothly finished, a satisfactorily low valve noise level is achieved. The relative valve throat angles have been found to be critical in that they should differ no more than 5 percent in relation to the nominal angle of the valve seat face. Since it is desired that abrupt changes in direction of fluid flow through the valve should be minimized, it is preferable to have the valve seat face nominal angle be at about 30°.

When the system is at rest, with the power steering pump 10 being driven, hydraulic fluid is permitted to flow freely through the power steering gear 18 and the booster 24 and return to the pump without restriction. When the vehicle is steered leftwardly or rightwardly, the power steering gear 18 operates to build up a back pressure in conduit 16 and establish a pressure differential to provide power to the steering gear, as is well known in the art. When the vehicle brake is actuated by depression of the brake pedal 40, the input member 70 moves forwardly, closing the space between valve seat face 130 and valve face 134. Initial closure will result in contact of the valve 132 with the valve seat face 130, causing the valve seat to move radially, if it was slightly off center, to align the valve seat with the valve. Such alignment may also occur when the brake pedal is depressed while the power steering pump is not operating. Due to the minimal width of the reaction piston lands 112 and 114, slight radial movement of the valve seat 94 is accomplished without binding the reaction piston 110. The lands have a pivotally sealing engagement with their respective cylinder surfaces which accommodates the valve seat radial movement.

Upon restricting the hydraulic fluid flow from the inlet chamber 80 to the outlet chamber 82, hydraulic pressure is built up in the inlet chamber to establish a pressure differential across the power piston 78. The increased pressure in inlet chamber 80 also acts in reaction chamber 120 to urge reaction piston 110 rearwardly against the force of spring 128. This initial reaction force is not transmitted to the input member 70 since the other end of spring 128 is seated on the valve seat 94. The pressure differential also urges the power piston 78 forwardly against the force of piston return spring 83, overcoming that spring and moving push rod 58 forwardly to actuate the master cylinder 30. As the pressure differential increases, reaction piston 110 is moved rearwardly until snubber piston 126 engages snubber 146. Since this normally happens quickly when the brakes are quickly applied, the movement of snubber piston 126 rearwardly into recess 144 displaces hydraulic fluid from that recess in a dashpot manner, providing a cushioning effect in the initial transmittal of reaction force to the input member 70. Further rearward movement of reaction piston 110 causes the snubber 146 to be compressed as it transmits additional reaction force to the input member as the pressure differential across the power piston 78 increases. It can be seen that at any required pressure differential the valve system will reach a poised position wherein the valve opening between faces 130 and 134 is just sufficient to maintain the required pressure differential and resulting braking effort. If for any reason the pressure should be built up in inlet chamber 80 beyond a desired pressure level, the pressure relief valve 152 will open, connecting the inlet chamber with outlet chamber through passages not shown so as to establish the pressure limit.

Upon brake release, the input member 70 is moved rearwardly by spring 140, slightly opening the valve faces and permitting a decrease in the pressure differential across power piston 78. When the brake is fully released, the valve 132 returns to its at-rest position with the valve return bumper 138 having cushioned its engagement with the cylinder rear wall 46. As the reaction piston 110 moves forwardly relative to power piston 78 upon brake release, it is similarly cushioned by snubber 116.

When the vehicle in which the booster is installed is operated during very cold weather, the booster must allow for the pressure influence of the cold viscous oil being pumped through the valve without applying the brakes and causing a dragging brake operation even though the vehicle operator has not applied the brakes. This is accomplished by allowing the power piston 78 to move slightly under the pressure influence of the cold viscous oil without pulling the valve 132 with the piston. This slight piston travel results in an increased valve opening before the piston travel is sufficient to apply the brakes through the master cylinder. This amount of piston travel is most easily provided for by establishing the length of push rod 58 so that the rear end of the push rod is slightly disengaged from the power piston when the booster is in the condition shown in FIG. 2. This is easily accomplished since the forward position of push rod 58 is determined by the master cylinder stop acting to position the master cylinder piston. This positioning of the master cylinder piston against a stop is well known in the master cylinder art.

The separating valve arrangement also minimizes the piston travel necessary to actuate the booster unit since the at-rest valve opening can be set for warm hydraulic fluid operating conditions which usually exist after the pump has been pumping the fluid through the system for a time. The action of the separating valve described above is also advantageous when foreign material is entrained in the hydraulic system. If, for example, a piece of rubber-like material or a small metal particle becomes so entrained, the foreign element will lodge in the valve opening, producing a reaction similar to that of the cold viscous oil, causing a slight buildup in pressure which moves the power piston to open the valve to a greater extent. This will allow the foreign object to pass through the valve easily and not affect brake booster control.

The noise level of the booster assembly relates, among other factors, to the natural frequency of vibration of various booster components and the cyclic pressure pulses generated by valve operation. When these frequencies and pulses are sympathetic, noise at an objectionable level may be generated. It has been found, in units suitable in size for passenger car use, that an angle $c$ of 30° reduces the noise to an acceptable level. In heavier units, suitable for trucks, for example, the angle $c$ may be as much as 45°. In some instances with such heavier units the tapered outlet and inlet angles $a$ and $b$ may be omitted and the valve face angle may be the same as the valve seat angle. This is permitted when the natural frequencies of vibration of components are substantially different from the cyclic pulses, and a short valve seat face is used. When cavitation-generated noises are at objectionable levels, the dual valve face arrangement, giving a venturi effect, contributes to noise reduction.

What is claimed is:

1. In a hydraulic booster having a cylinder and a movable power wall dividing said cylinder into a hydraulic fluid inlet chamber and a hydraulic fluid outlet chamber, said power wall having passage means therethrough including an axially extending recess and connecting said inlet chamber and said outlet chamber:

open center valve means for controlling hydraulic fluid flow from said inlet chamber to said outlet chamber through said passage means and including
an annular valve seat mounted in said recess for limited radial movement and held against axial movement relative to said power wall,
a valve positioned in mating relation with said valve seat and axially movable relative thereto to control hydraulic fluid flow from said inlet chamber to said outlet chamber and having an axial extension extending through said valve seat and provided with an axially extending cylinder-like recess opening into said power wall recess, and
first yieldable means between said valve and said valve seat urging them axially apart;
a hydraulic reaction piston reciprocably mounted in said power wall recess and in a cylindrical portion of said valve seat and including axially spaced first and second sealed pivotal lands respectively sealed and pivoted on a wall of said power wall recess and said valve seat cylindrical portion and having axially extending passage means therethrough positioned radially inwardly of said lands and providing free fluid communication between the orifice formed by said valve and valve seat and the portion of said power wall passage means communicating with said outlet chamber, said first sealed pivotal land having a smaller diameter than said second sealed pivotal land, said sealed pivotal lands permitting limited radial movement of said valve seat while accommodating free axial movement of said reaction piston relative to said valve seat and said power wall, the wall of said power wall recess and a portion of said reaction piston intermediate and including said lands defining a reaction chamber having a passage in continuous fluid communication with said inlet chamber;

second yieldable means between said reaction piston and said valve seat providing line pressure support for said reaction piston;

and said valve extension cylinder-like recess having a resilient snubber therein and said reaction piston having a snubber piston thereon extending into said cylinder-like recess in circumferentially spaced relation thereto and movable toward said snubber upon relative closing movement of said reaction piston and said valve to initially cause hydraulic damping of said movement by displacement of hydraulic fluid from said cylinder-like recess past said snubber piston, said snubber piston then being engageable with said snubber to further damp said movement and to transmit reaction force from said reaction piston to said valve.

* * * * *